(12) United States Patent
Fattal et al.

(10) Patent No.: US 11,454,580 B2
(45) Date of Patent: Sep. 27, 2022

(54) METHOD FOR PREFORM OR TUBE DRAWING BASED ON ITS VISCOSITY

(71) Applicant: HERAEUS QUARTZ NORTH AMERICA LLC, Buford, GA (US)

(72) Inventors: Georges Levon Fattal, Suwanee, GA (US); James E. Beavers, Jr., Flowery Branch, GA (US); Kai Huei Chang, Decatur, GA (US); Evan P. Green, Lawrenceville, GA (US); Qiulin Ma, Alpharetta, GA (US)

(73) Assignee: Heraeus Quartz North America LLC, Buford, GA (US)

( * ) Notice: Subject to any disclaimer, the term of this patent is extended or adjusted under 35 U.S.C. 154(b) by 46 days.

(21) Appl. No.: 15/517,045

(22) PCT Filed: Oct. 14, 2014

(86) PCT No.: PCT/US2014/060403
§ 371 (c)(1),
(2) Date: Apr. 5, 2017

(87) PCT Pub. No.: WO2016/060646
PCT Pub. Date: Apr. 21, 2016

(65) Prior Publication Data
US 2017/0254733 A1    Sep. 7, 2017

(51) Int. Cl.
*G01N 11/06* (2006.01)
*G01N 11/02* (2006.01)
(Continued)

(52) U.S. Cl.
CPC ............ *G01N 11/06* (2013.01); *C03B 23/047* (2013.01); *C03B 37/01242* (2013.01);
(Continued)

(58) Field of Classification Search
CPC ............ C03B 37/0253; C03B 2205/40; C03B 37/01242
See application file for complete search history.

(56) References Cited

U.S. PATENT DOCUMENTS 3,239,325 A    3/1966   Roberson et al.
4,163,370 A *  8/1979   Kurth .................... C03B 37/027
                                                      385/123
(Continued)

FOREIGN PATENT DOCUMENTS

DE    102011116806 A1    4/2013
FR         2767810 A1    3/1999
(Continued)

OTHER PUBLICATIONS

International Search Report and Written Opinion dated Jun. 10, 2015 by the European Patent Office for counterpart international patent application No. PCT/US2015/060403.
(Continued)

*Primary Examiner* — Lisa L Herring
(74) *Attorney, Agent, or Firm* — Stradley Ronon Stevens & Young, LLP

(57) ABSTRACT

Methods for preform and tube draw based on controlling forming zone viscosity determined by calculating a holding force exerted by the glass component in the forming zone on the strand being drawn below. The holding force may be calculated by determining a gravitational force applied to the strand and a pulling force applied to the strand by a pulling device, where the holding force is equal to the opposite of the algebraic sum of the gravitational and pulling forces. The holding force may also be calculated by measuring a stress-induced birefringence in the strand at a point between the forming zone and the pulling device, determining an amount of force applied to the strand at the point corresponding to the birefringence, and calculating the holding force by
(Continued)

correcting the amount of force for a gravitational effect of the weight of the strand between the forming zone and the point.

17 Claims, 5 Drawing Sheets

(51) Int. Cl.
  *C03B 37/012*  (2006.01)
  *G01N 11/00*  (2006.01)
  *C03B 23/047*  (2006.01)
  *G01N 11/08*  (2006.01)
  *G01N 11/04*  (2006.01)

(52) U.S. Cl.
  CPC ............ *G01N 11/00* (2013.01); *G01N 11/02* (2013.01); *G01N 11/08* (2013.01); *C03B 23/0473* (2013.01); *C03B 37/0124* (2013.01); *C03B 2205/40* (2013.01); *G01N 11/04* (2013.01); *G01N 2011/006* (2013.01)

(56) References Cited

U.S. PATENT DOCUMENTS

| | | | |
|---|---|---|---|
| 4,389,574 A | | 6/1983 | Shofner et al. |
| 4,553,994 A | | 11/1985 | Greene et al. |
| 4,737,178 A | * | 4/1988 | Reifschneider ......... C03B 37/04 65/384 |
| 4,877,436 A | | 10/1989 | Sheinkop Isac |
| 5,079,433 A | | 1/1992 | Smith |
| 5,449,393 A | * | 9/1995 | Tsuneishi ............ C03B 37/0253 356/73.1 |
| 6,098,428 A | | 8/2000 | Bogdahn et al. |
| 6,324,872 B1 | * | 12/2001 | Blaszyk .................. C03B 37/03 65/504 |
| 6,386,001 B1 | * | 5/2002 | Shimizu ................ C03B 23/047 65/377 |
| 7,003,983 B2 | | 2/2006 | Morishita et al. |
| 7,145,646 B2 | * | 12/2006 | Martinelli ........... C03B 37/0253 356/73.1 |
| 7,430,880 B2 | | 10/2008 | Butts et al. |
| 7,600,399 B2 | | 10/2009 | Bogdahn et al. |
| 7,658,086 B2 | | 2/2010 | Okada et al. |
| 7,926,304 B2 | * | 4/2011 | Costello, III ....... C03B 37/0253 65/377 |
| 8,181,486 B2 | | 5/2012 | Yoshida et al. |
| 9,027,815 B2 | | 5/2015 | Kudva et al. |
| 2001/0038740 A1 | | 11/2001 | Hasegawa et al. |
| 2002/0066292 A1 | * | 6/2002 | Wang .................. C03B 37/0253 65/382 |
| 2005/0089288 A1 | | 4/2005 | Saito |
| 2006/0147163 A1 | | 7/2006 | Mayhew et al. |
| 2008/0216515 A1 | | 9/2008 | Kumada et al. |
| 2009/0205374 A1 | * | 8/2009 | Pata .................. C03B 37/02745 65/402 |

FOREIGN PATENT DOCUMENTS

| | | |
|---|---|---|
| JP | S46-5834 | 2/1971 |
| JP | S60186431 A | 9/1985 |
| JP | S60260440 A | 12/1985 |
| JP | S61-501772 | 8/1986 |
| JP | H0337129 A | 2/1991 |
| JP | H03-115131 A | 5/1991 |
| JP | H03-146433 A | 6/1991 |
| JP | H04-283637 | 10/1992 |
| JP | H05139771 A | 6/1993 |
| JP | H10-167751 A | 6/1998 |
| JP | 2000-302470 A | 10/2000 |
| JP | 2001-010839 A | 1/2001 |
| JP | 2001019457 A | 1/2001 |
| JP | 2002-145634 | 5/2002 |
| JP | 2003-048732 A | 2/2003 |
| JP | 2004-307250 | 11/2004 |
| JP | 2005-053754 | 3/2005 |
| JP | 2005225704 A | 8/2005 |
| JP | 2005-314118 A | 11/2005 |
| JP | 2007-031207 | 2/2007 |
| JP | 2007-514164 | 5/2007 |
| JP | 2008-501605 | 1/2008 |
| JP | 2010-168244 | 8/2010 |
| JP | 2012-51787 | 3/2012 |
| WO | 03/022757 A1 | 3/2003 |
| WO | 2005/049516 A1 | 6/2005 |
| WO | 2009/063756 | 5/2009 |

OTHER PUBLICATIONS

Office Action dated May 28, 2018 by the Japanese Patent Office for counterpart Japanese Patent Application No. 2017-518316 with an English translation of the Notification of Reasons for Refusal (office action) attached.

Office Action dated Aug. 5, 2019 by the Japanese Patent Office for counterpart Japanese Patent Application No. 2017-518316 with an English translation of the Notification of Reasons for Refusal (office action) attached.

Office Action dated Jan. 7, 2019 by the Japanese Patent Office for counterpart Japanese Patent Application No. 2017-518316 with an English translation of the Notification of Reasons for Refusal (office action) attached.

Anonymous, "Viscosity" Wikipedia, Last edited Aug. 17, 2020, retrieved Aug. 24, 2020 from https://en.wikipedia.org/wiki/Viscosity.

Office Action/Notification of Reasons for Refusal dated Jul. 6, 2021 by the Japanese Patent Office for counterpart Japanese Patent Application No. 2020-157799 with an English translation of the office action attached.

* cited by examiner

METHOD FOR PREFORM OR TUBE DRAWING BASED ON ITS VISCOSITY

TECHNICAL FIELD

The invention relates generally to fabricating glass preforms or tubes, and particularly to controlling the viscosity of the preform or tubes while it is being drawn by measuring and calculating a holding force applied to the preform or tubes.

BACKGROUND

Optical preforms, quartz glass tubes, or rods are produced by introducing a quartz glass component (e.g., a cylinder, an ingot, or an uncollapsed rod-in-cylinder (RICs) assembly with core rods inserted inside the cylinder) into a heating zone in a vertical orientation such that the lower end begins to soften and form a strand. The strand is then placed in a pulling device, for example a device including one or more sets of pulling wheels. The rate of draw of the strand is controlled by the speed of the pulling wheels, which may apply either a downward or upward force depending on the forming zone temperature or viscosity and the weight of the strand supported by the wheels.

To achieve a repeatable manufacturing process, the viscosity of the quartz glass component in the forming zone (i.e., at or just below the heating zone) must be controlled for a given preform or tube dimension, throughput, and component geometry. This is particularly relevant for preform draw from the uncollapsed RIC assembly because when furnace temperature is either too high or too low (i.e., the glass viscosity either too low or too high), the core rod glass will flow at a different rate than that of the overclad glass which results in a distorted and unacceptable waveguide for optical fiber applications. For example, a change of +/−10° C. has a significant impact on viscosity when the glass is heated to 2000° C. Current techniques of controlling the preform or tube draw involve the use of optical pyrometers to measure the glass temperature above the heating zone, below the heating zone, and/or the temperature of the outside surface of the heating element. However, temperature-based methods of controlling preform or tube draw are unreliable as the measured pyrometer temperature can vary greatly due to variances such as differences in sighting the pyrometer, obstructions on the pyrometer tube, cleanliness of the pyrometer lens, or calibration and drift of the sensor itself. Because viscosity has an exponential relationship with temperature (e.g., in some cases a 30° C. change in temperature can result in a 200% change in viscosity), even small errors in measured temperature lead to large differences in the viscosity and therefore forming behavior. Accordingly, a new method of determining the effective viscosity and therefore a more accurate absolute draw temperature and then using it to control preform or tube draw is desirable.

The terms "viscosity" and "effective viscosity" are well known. See, for example, www.en.wikipedia.org/wiki/viscosity. Viscosity is a material property that relates the viscous stresses in a material to the rate of change of a deformation (the strain rate). The viscosity of a fluid is a measure of its resistance to deformation at a given rate. Formally, viscosity (represented by the symbol n or "eta") is the ratio of the shearing stress (F/A) to the velocity gradient ($\Delta v_x/\Delta z$ or $dv_x/dz$) in a fluid. An effective viscosity can be defined in terms of stress and strain components which are averaged over a relatively large volume. By definition, the effective viscosity means the viscosity of the fluid that gives the same shear stress at the same shear rate.

SUMMARY

The invention provides for methods for determining the effective viscosity of a forming region of a glass preform or tubing fabrication process. During the fabrication process, a bulk glass component is heated and a strand is drawn from the bulk glass component. A pulling device is used to control the rate at which the strand is drawn by applying either an upward or a downward force to the strand. The invention further provides for methods of producing an elongated component of glass including heating a bulk glass component at a forming region at a temperature, drawing a strand from the bulk glass component at the forming region, using a pulling device to control the rate at which the strand is drawn from the bulk glass component, calculating a holding force applied by the softened region, determining whether the holding force is equal to a desired holding force based on a desired viscosity of the forming region, and adjusting the temperature of the forming region if the holding force is not equal to the desired holding force. In the methods, viscosity is measured by calculating a holding force applied to the strand by the bulk glass component and correlating the holding force with the viscosity of the forming region.

In some embodiments, the holding force is calculated by determining a gravitational force applied to the strand, determining a pulling force applied to the strand by the pulling device, and calculating a holding force applied to the strand by the bulk glass component based on the gravitational force and the pulling force. The sum of the holding force, the pulling force, and the gravitational force equals zero (because at a constant draw speed there is no acceleration and therefore the net force on the strand is zero).

In some other embodiments, the holding force is calculated by measuring a stress-induced birefringence in the strand at a point between the heating region and the pulling device, determining an amount of force applied to the strand at the point which corresponds to the measured stress-induced birefringence, and calculating the holding force by correcting the amount of force for a gravitational effect of the weight of the strand between the heating region and the point.

The apparatus for controlling preform or tube draw based on the viscosity of the forming region includes a heating zone for heating the bulk glass component immediately above the forming zone, a system for determining the force applied to the strand by the pulling device, and a system for determining the weight of the strand. In one embodiment, the system for determining the force applied to the strand by the pulling device is a voltage meter for measuring the voltage applied to a motor of the pulling device, wherein the voltage can be calibrated with the force applied to the strand by the pulling device. In another embodiment, the system for determining the force applied to the strand by the pulling device is one or more load cells mounted to the pulling device.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 1:
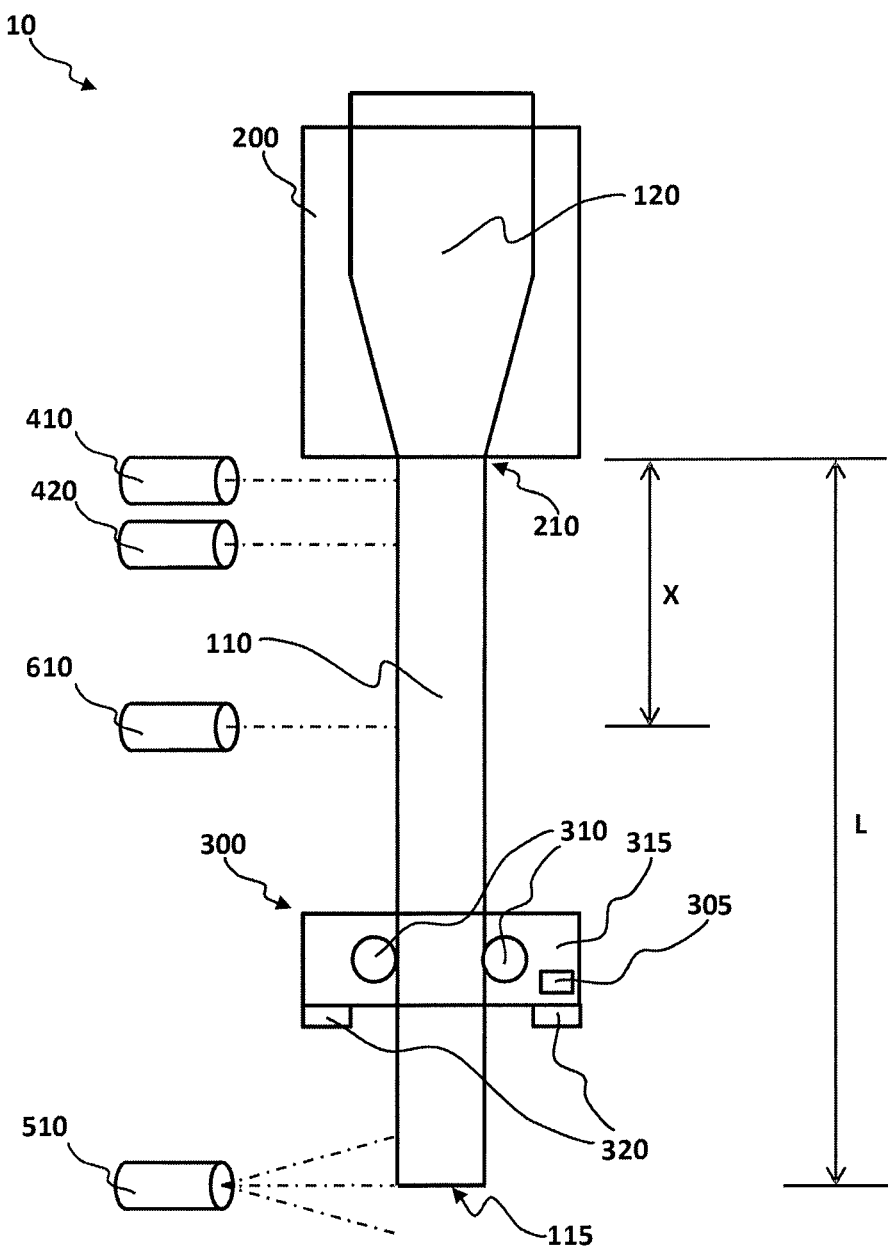
FIG. 1 is a schematic view of an apparatus for forming a glass preform or tube, according to an embodiment of the invention.

Referring to FIG. 1, an apparatus 10 may be used to form a glass strand 110 from a bulk glass component 120 (e.g., a glass cylinder or ingot). By heating the glass component 120 in a heating zone 200, the lower end of the glass component 120 will soften and form the strand 110. The strand 110 may enter a pulling device 300 including a motor 305 driving a plurality of pulling wheels 310, where the pulling wheels 310 either apply a downward force or an upward force to the strand 110 to control the rate of draw from the glass component 120. A downward force will increase the rate of draw whereas a upward force will decrease the rate of draw.

Figure 2:
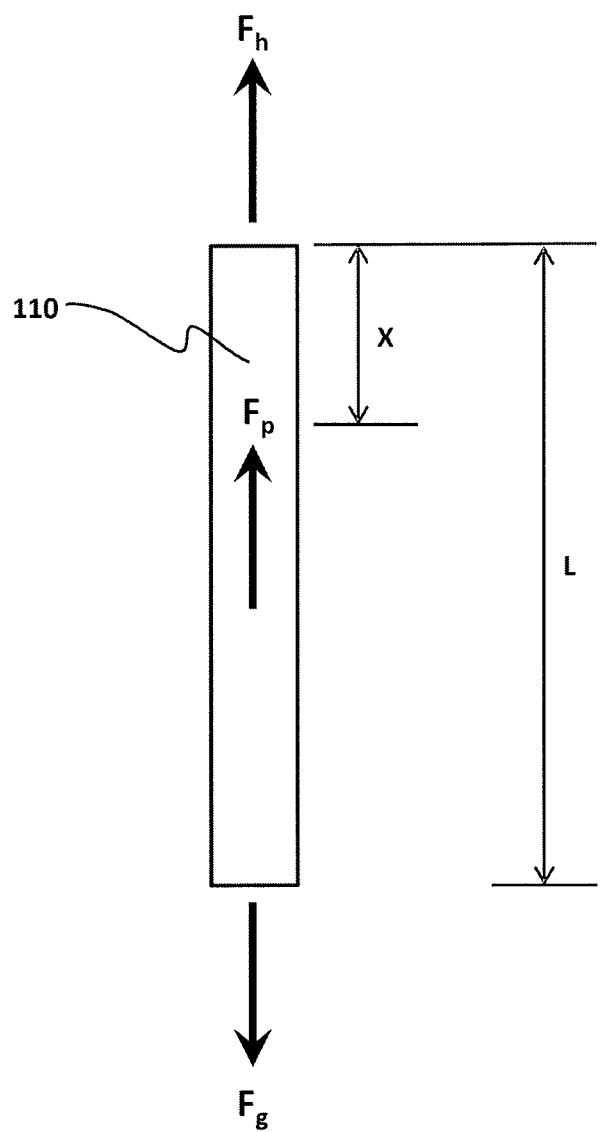
FIG. 2 is a diagram depicting the various forces applied to a glass strand formed by the apparatus of FIG. 1; according to an embodiment of the invention.
Figure 3A:
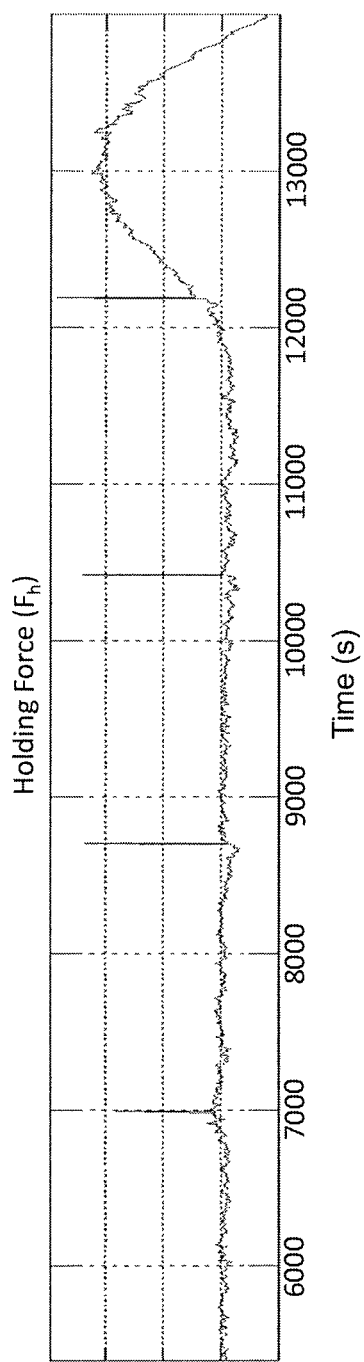
FIGS. 3A-3E are a series of graphs depicting how holding force (FIG. 3A), puller force (FIG. 3B), strand length (FIG. 3C), glass temperature (FIG. 3D) and draw speed (FIG. 3E) can vary as a function of time during an exemplary preform or tube draw process; according to an embodiment of the invention.
Figure 3B:
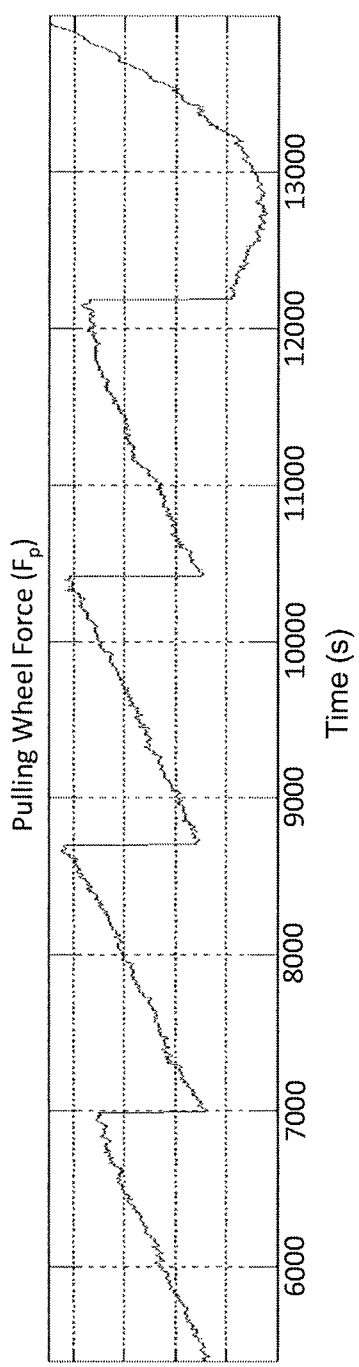
Figure 3C:
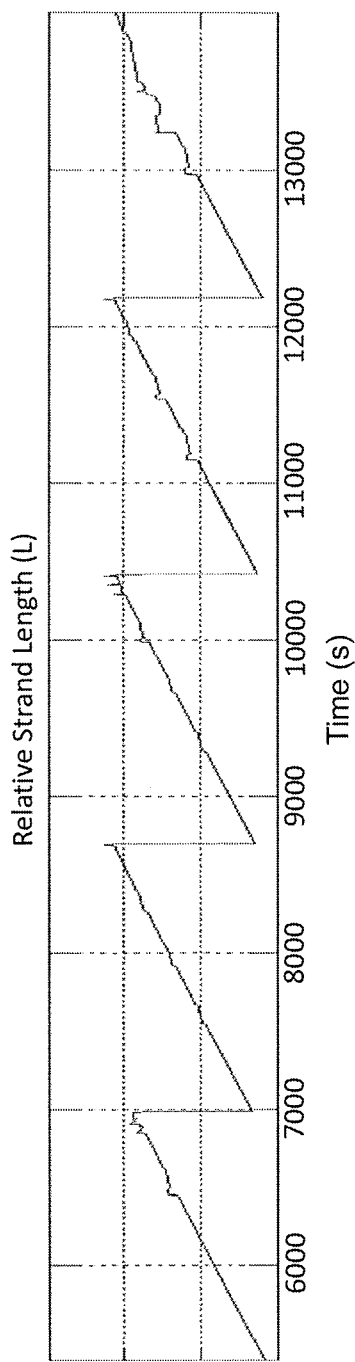
Figure 3D:
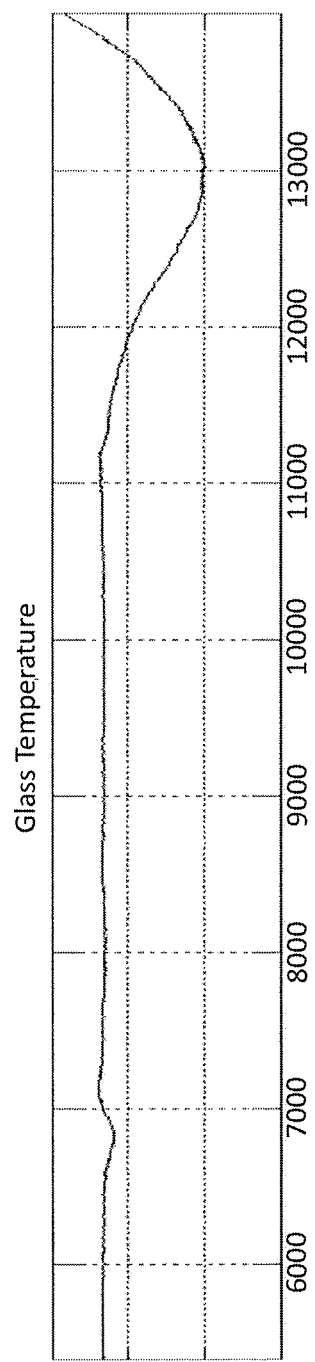
Figure 3E:
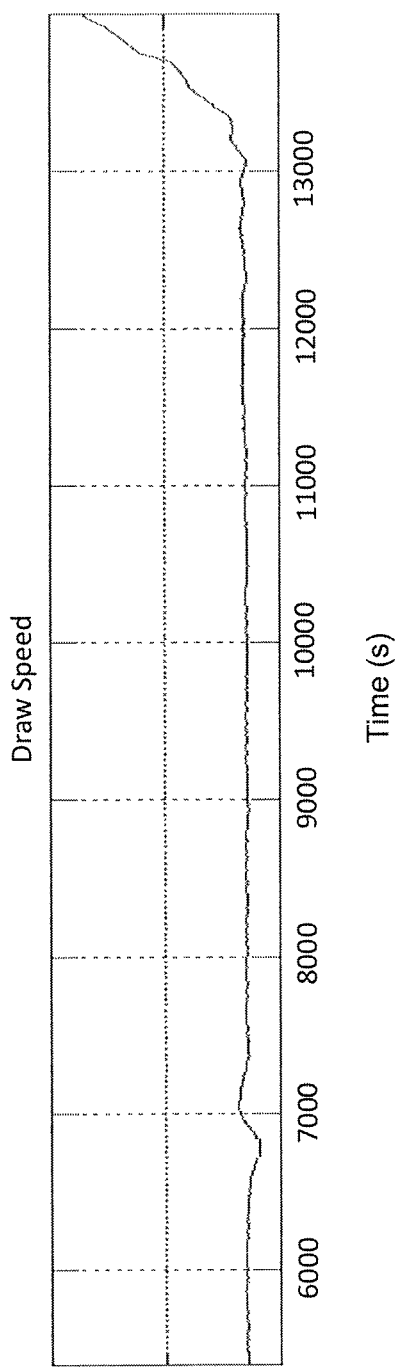

Referring to FIG. 2, embodiments employing the apparatus 10 to determine the viscosity of the forming region 210 by calculating a holding force $F_h$ exerted by the forming region 210 on the glass strand 110. The holding force $F_h$ at the forming region 210 is predominantly due to the viscosity of the glass with a small and relatively constant contribution from the surface tension of the molten glass. Because of the exponential dependency of viscosity on temperature, even a small absolute temperature change at the forming region may result in a large change in viscosity and subsequently a large change in the holding force $F_h$ as well. Therefore, for preform or tube draw, particularly that for waveguide or optical fiber applications requiring minimum distortion in clad-to-core ratios, controlling the holding force $F_h$ or the effective viscosity at the forming region is a more accurate and sensitive way to achieve high quality and yield in production rather than using the conventional pyrometer-based temperature measurement and controls with its many inaccuracies. If the holding force $F_h$ deviates from the desired holding force based on the desired viscosity of the forming region 210, the supplied heat to the heating zone may be corrected to achieve the desired viscosity in the forming region 210.

In order to determine the holding force $F_h$, all the other forces exerted on the glass strand 110 should be considered: namely, a pulling force $F_p$ applied by the pulling device 300 and a gravitational force $F_g$ (i.e., the weight of the strand 110 below the forming region 210). While the pulling force $F_p$ is depicted in FIG. 2 as an upward force in the same direction as the holding force $F_h$, as discussed above the pulling device 300 may apply either a downward force or an upward force to the strand 110. Accordingly, it will be understood that, as used in the formulas, $F_p$ is positive when the pulling device 300 applies an upward force to the strand 110 in the opposite direction of the gravitational force $F_g$ and negative when the pulling device 300 applies a downward force to the strand 110 in the same direction of the gravitational force $F_g$ (which is herein a negative number by definition). As the net force applied to the strand 110 is zero because the glass strand is drawn at a constant speed with zero acceleration (formula 1), the holding force may be calculated as the opposite of the algebraic sum of the other forces acting on the strand 110 (formula 2).

$$F_h + F_p + F_g = 0 \quad (1)$$

$$F_h = -(F_g + F_p) \quad (2)$$

Therefore, the holding force $F_h$ may be calculated by determining the algebraic sum of the gravitational force $F_g$ and the pulling force $F_p$ applied to the strand 110. By calculating the holding force $F_h$, the effective viscosity of the forming region 210 may then be determined.

The gravitational force $F_g$ may be calculated by determining the mass m of the strand 110 multiplied by the gravitational constant g (e.g., approximately −9.81 m/s where the minus sign indicates the downward direction of the gravitational acceleration or force) (formula 4). The mass m of the strand 110 is equal to the length L of the strand 110 multiplied by its cross-sectional area A multiplied the density p of the strand 110 (formula 3).

$$m = L*A*\rho \quad (3)$$

$$F_g = m*g = L*A*\rho*g \quad (4)$$

The cross-sectional area A and the density p of the strand 110 are constant and predetermined for the particular process and glass material. In some embodiments, the cross-sectional area A may be determined or verified by gauges 410, 420. In an exemplary embodiment, the cross-sectional area A may range from approximately 1 cm$^2$ to approximately 400 cm$^2$. The density p for a silica glass strand is typically approximately 2.2 g/cm$^3$. However, greater and lesser cross-sectional areas and densities are explicitly contemplated, for example for glass strands made of materials other than silica. It is noted that for a tube, the cross-sectional area A does not include the hollow interior of the tube (e.g., for a tube with an outside diameter $d_1$ and an inside diameter $d_2$, $A=\pi[(d_1/2)^2-(d_2/2)^2]$). The length L of the strand is determined by either measuring the velocity with which the strand 110 is formed, or by using a tracking system 510 (FIG. 1) to determine the position of the end 115 of the strand 110. The tracking system 510 may include a camera vision system, a laser system, or a mechanical device to determine the vertical position of the end 115 of the strand 110. While FIG. 1 depicts the tracking system 510 as including only a single component, the tracking system 510 may include multiple components, for example a series of cameras arrayed vertically along the strand 110.

It is to be noted here that in a typical preform or tube draw process, both the length of the glass strand (L) and its weight ($F_g$) increase so that the puller force ($F_p$) should also be increased in order to maintain the constant draw speed (and zero net force on the glass strand) (i.e., apply a more upward force while the temperature or viscosity dependent holding force $F_h$ remains constant). The strand 110 may be periodically cut, in which case greater adjustments to the pulling force $F_p$ are required. FIGS. 3A-3E depict an example of how the holding force ($F_h$), puller force ($F_p$), strand length (L), glass temperature and draw speed can vary as a function of time during the preform or tube draw process. The saw tooth-like behavior for puller force ($F_p$) and strand length (L) is due to: (a) the increasing length and weight of the strand held by the pullers during draw, (b) the increasing puller force necessary to support it and maintain the constant draw speed, and (c) the periodic cut and removal of the strand 110.

In one embodiment, the pulling force $F_p$ is determined by voltage applied to the pulling device 300 and the torque of the pulling wheels 310. For a given motor, the torque applied by the motor can be determined based on the voltage applied to the motor. From the torque, the pulling force $F_p$ may be calculated based on the diameter of the pulling wheels 310, as the magnitude of torque is dependent on both the magnitude of the force and distance between where the torque is measured and where the force is applied. The voltage applied to the pulling device 300 may be measured by a voltage meter attached to the pulling device.

In another embodiment, the pulling force $F_p$ is determined by measuring the output of load cells 320 mounted directly to the frame 315 of the pulling device 300. Load cells 320 are transducers that convert a force applied by the pulling wheels 310 to a strain gauge (not shown) of each load cell 320 into an electrical signal. The electrical signal may then be measured and correlated to the force applied to the strain gauge. Exemplary load cells include hydraulic load cells, pneumatic load cells, and strain gauge load cells. In another embodiment, the pulling device 300 may include a gripping device such as a chuck or a clamp (not shown) that clamps onto the strand and moves vertically on a tower located under the heating zone 200. In such embodiments, the pulling force $F_p$ may be measured by mounting the load cells 320 to the arms or the carriage of the gripping device.

In another embodiment, the holding force $F_h$ may be determined by measuring stress-induced birefringence within the strand 110. Stress-induced birefringence refers to the change in the refractive index of a material such as glass when deformed due to mechanical stress. The greater degree of mechanical stress, the greater the change in refractive index. To determine the magnitude of the stress-induced birefringence, a sensor 610 may be positioned at or below the forming zone 210, for example at a distance x between the forming zone 210 and the pulling device 300. A polarized light source (not shown) may emit a polarized light onto the strand 110 and the degree of transmission through the strand 110 measured by the sensor 610.

The distance x is preferably kept small enough that the strand 110 is still at approximately the annealing temperature when the mechanical tensile stress-induced birefringence is measured. If the distance x is too great, the strand 110 will begin to cool from the annealing temperature in the forming zone 210 and thermal and residual stresses caused by the degree of cooling will be introduced into the strand 110 and must be accounted for, greatly complicating the determination of the purely mechanically induced stress from the forces $F_h$, $F_p$, and $F_g$.

As previously discussed, the net force on the strand 110 is zero because the strand is being drawn at constant speed with no acceleration. Accordingly, at each point along the strand, there is an upward force and a downward force with equal magnitude but in opposite directions. The opposing upward and downward forces can result in two situations: (1) tension, where the strand is being pulled at the two ends like in a rope and resulting in positive stress; and (2) compression, where the strand is being pushed at the two ends resulting in negative stress. Whether in tension or in compression, at any point along the strand 110 where the strand 110 is still at approximately the annealing temperature, the magnitude of the measured mechanically-induced stress S multiplied by the cross-sectional area of the strand A is equal to the magnitude of either the upward force or the downward force applied to the strand at the point:

$$|S*A|=|\text{upward force}|=|\text{downward force}| \qquad (5)$$

For a point between the forming zone 210 and the pulling device 300 at a distance x below the forming zone 210, the upward force is equal to the holding force $F_h$ minus the weight of the strand above the point, according to formula (6).

$$\text{(upward force)}=F_h-(\text{strand weight above the point})$$
$$=F_h-|x*A*\rho*g| \qquad (6)$$

According to the sign conventions described above where g is negative, $$\text{(upward force)}=F_h+(x*A*\rho*g). \qquad (7)$$

Because the net force on the strand is zero, the magnitude of the upward force equals the magnitude of the downward force, and formula (7) may be substituted into formula (5) for the upward force, resulting in formula (8). Using formula (8), $F_h$ may be solved for according to formula (9).

$$S*A=F_h+(x*A*\rho*g) \qquad (8)$$

$$F_h=(S*A)-(x*A*\rho*g) \qquad (9)$$

As shown in Formula (8), when x approaches zero the holding force $F_h$ simply becomes $S*A$; otherwise, the holding force $F_h$ will be $S*A$ plus the weight of the strand above the point x (i.e. $|x*A*\rho*g|$).

Because the amount of stress-induced birefringence resulting from a particular stress is a known property of the material of the strand 110, and gravitational effect or correction (i.e., $|x*A*p*g|$) is easily determined from all known and essentially constant values (i.e., x, A, ρ, and g), the holding force $F_h$ may be deduced by determining the amount of force that results in the measured stress-induced birefringence (i.e., $S*A$). In other words, in this embodiment, the holding force $F_h$ may be determined from the stress within the glass strand at the known distance x without the need to measure the continuously changing glass strand length L or the pulling force $F_p$ directly.

We claim:

1. A method of producing an elongated strand of a glass component upon which a gravitational force is applied, the method comprising:

providing an apparatus having a heating zone generating heat and being configured to heat the glass component from which the strand is drawn at a constant speed and a pulling device configured to apply a pulling force to the strand;

determining the pulling force;

heating the glass component in the heating zone to create a forming region in the glass component, the forming region exerting a holding force on the strand;

calculating the holding force;

calculating the gravitational force applied to the strand;

controlling the holding force by correcting the heat in the heating zone; and adjusting the pulling force of the pulling device to maintain the constant draw speed, wherein a sum of the holding force, the gravitational force, and the pulling force is maintained as zero.

2. The method of claim 1, wherein calculating the holding force comprises determining a sum of the gravitational force and the pulling force.

3. The method of claim 1, wherein calculating the holding force comprises:

measuring a stress-induced birefringence in the strand at a point at or below the forming region;

determining an amount of force value applied to the strand at the point, which corresponds to the measured stress-induced birefringence; and correcting the force value to account for a gravitational effect of the weight of the strand between the heating zone and the point, wherein the correction of the force value is zero if the point is at the forming region.

4. The method of claim 3, wherein the step of measuring the stress-induced birefringence in the strand comprises:
positioning the strand between a sensor and a polarized light source;
emitting a polarized light from the polarized light source onto the strand; and
measuring a degree of transmission of the polarized light through the strand by the sensor.

5. The method of claim 1, wherein determining the pulling force applied to the strand by the pulling device comprises:
measuring a voltage applied to the pulling device;
measuring a torque applied by the pulling device to the strand;
calculating the pulling force from the voltage and the torque.

6. The method of claim 1, wherein determining the pulling force applied to the strand by the pulling device comprises measuring an output of a load cell mounted to the pulling device.

7. The method of claim 6, wherein the step of providing an apparatus further comprises providing the pulling device with a gripping device having an arm and being configured to clamp onto the strand and move under the heating zone, and wherein the load cell is mounted to the arm of the gripping device.

8. The method of claim 1, wherein the strand has a mass and calculating the gravitational force applied to the strand comprises determining the mass of the strand multiplied by the gravitational constant.

9. A method of producing an elongated strand of a glass component upon which a gravitational force is applied, the method comprising:
providing an apparatus having a heating zone generating heat and being configured to heat the glass component from which the strand is drawn at a constant speed, the strand having a mass, and a pulling device configured to apply a pulling force to the strand;
determining the pulling force;
heating the glass component in the heating zone to create a forming region in the glass component, the forming region exerting a holding force on the strand;
calculating the gravitational force applied to the strand by determining the mass of the strand multiplied by the gravitational constant;
calculating the holding force by determining a sum of the gravitational force and the pulling force;
controlling the holding force by correcting the heat in the heating zone; and
adjusting the pulling force of the pulling device to maintain the constant draw speed,
wherein a sum of the holding force, the gravitational force, and the pulling force is maintained as zero.

10. The method of claim 9, wherein determining the pulling force applied to the strand by the pulling device comprises:
measuring a voltage applied to the pulling device;
measuring a torque applied by the pulling device to the strand;
calculating the pulling force from the voltage and the torque.

11. The method of claim 9, wherein determining the pulling force applied to the strand by the pulling device comprises measuring an output of a load cell mounted to the pulling device.

12. The method of claim 11, wherein the step of providing an apparatus further comprises providing the pulling device with a gripping device having an arm and being configured to clamp onto the strand and move under the heating zone, and wherein the load cell is mounted to the arm of the gripping device.

13. A method of producing an elongated strand of a glass component upon which a gravitational force is applied, the method comprising:
providing an apparatus having a heating zone generating heat and being configured to heat the glass component from which the strand is drawn at a constant speed, the strand having a mass, and a pulling device configured to apply a pulling force to the strand;
determining the pulling force;
heating the glass component in the heating zone to create a forming region in the glass component, the forming region exerting a holding force on the strand;
calculating the holding force by measuring a stress-induced birefringence in the strand at a point at or below the forming region, determining an amount of force value applied to the strand at the point, which corresponds to the measured stress-induced birefringence, and correcting the force value to account for a gravitational effect of the weight of the strand between the heating zone and the point, wherein the correction of the force value is zero if the point is at the forming region;
calculating the gravitational force applied to the strand by determining the mass of the strand multiplied by the gravitational constant;
controlling the holding force by correcting the heat in the heating zone; and
adjusting the pulling force of the pulling device to maintain the constant draw speed,
wherein a sum of the holding force, the gravitational force, and the pulling force is maintained as zero.

14. The method of claim 13, wherein the step of measuring the stress-induced birefringence in the strand comprises:
positioning the strand between a sensor and a polarized light source;
emitting a polarized light from the polarized light source onto the strand; and
measuring the degree of transmission of the polarized light through the strand by the sensor.

15. The method of claim 13, wherein determining the pulling force applied to the strand by the pulling device comprises:
measuring a voltage applied to the pulling device;
measuring a torque applied by the pulling device to the strand;
calculating the pulling force from the voltage and the torque.

16. The method of claim 13, wherein determining the pulling force applied to the strand by the pulling device comprises measuring an output of a load cell mounted to the pulling device.

17. The method of claim 16, wherein the step of providing an apparatus further comprises providing the pulling device with a gripping device having an arm and being configured to clamp onto the strand and move under the heating zone, and wherein the load cell is mounted to the arm of the gripping device.

* * * * *